July 23, 1946.   E. GRONEMEYER   2,404,631
MOLDING DIE AND MEANS FOR REMOVING MOLDED ARTICLES THEREFROM
Filed Feb. 9, 1944   4 Sheets-Sheet 3

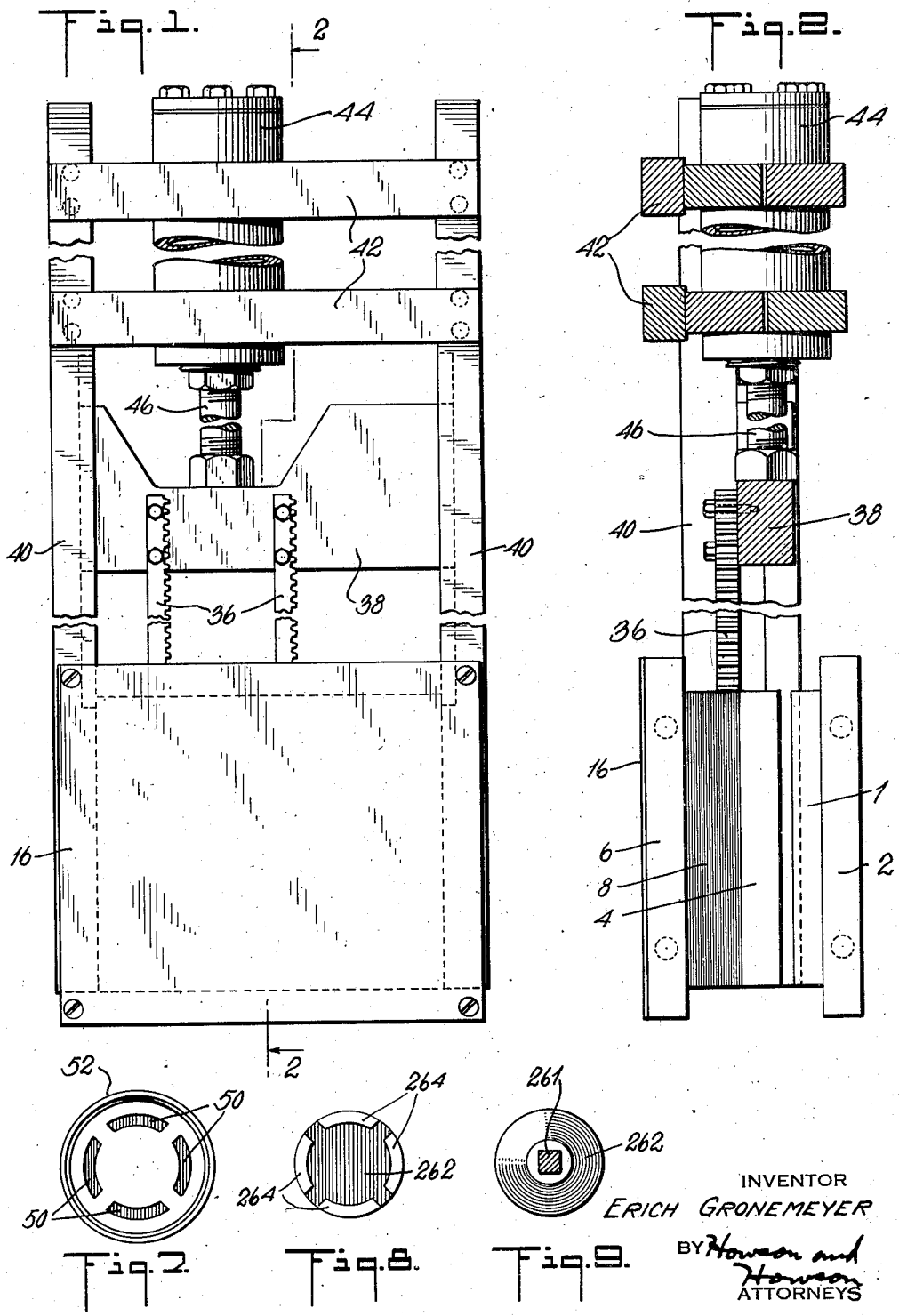

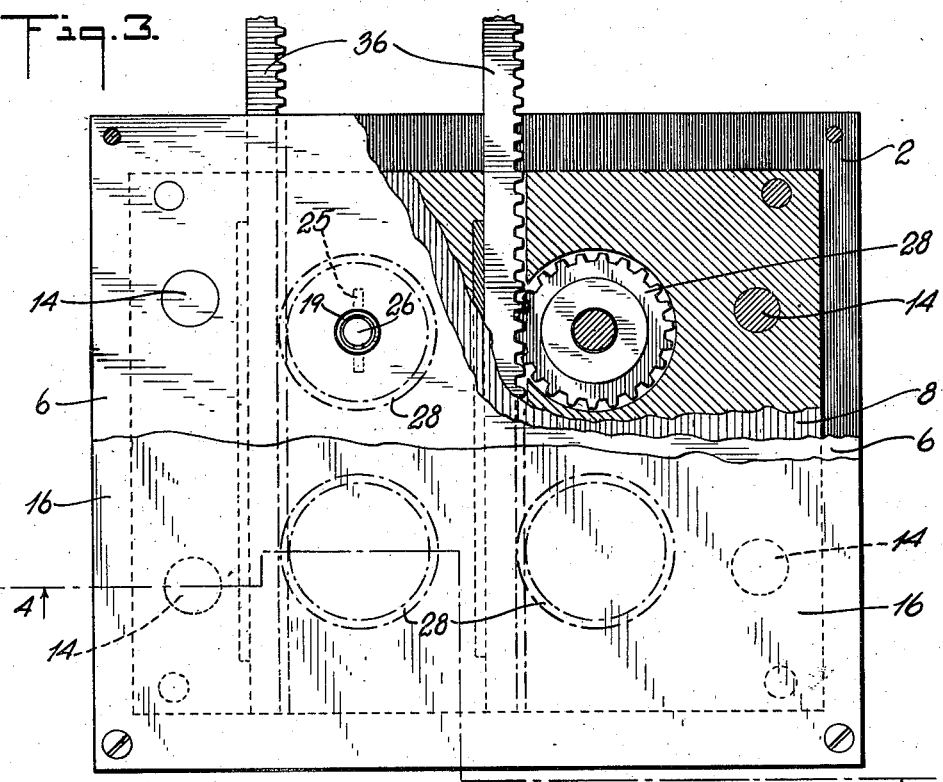
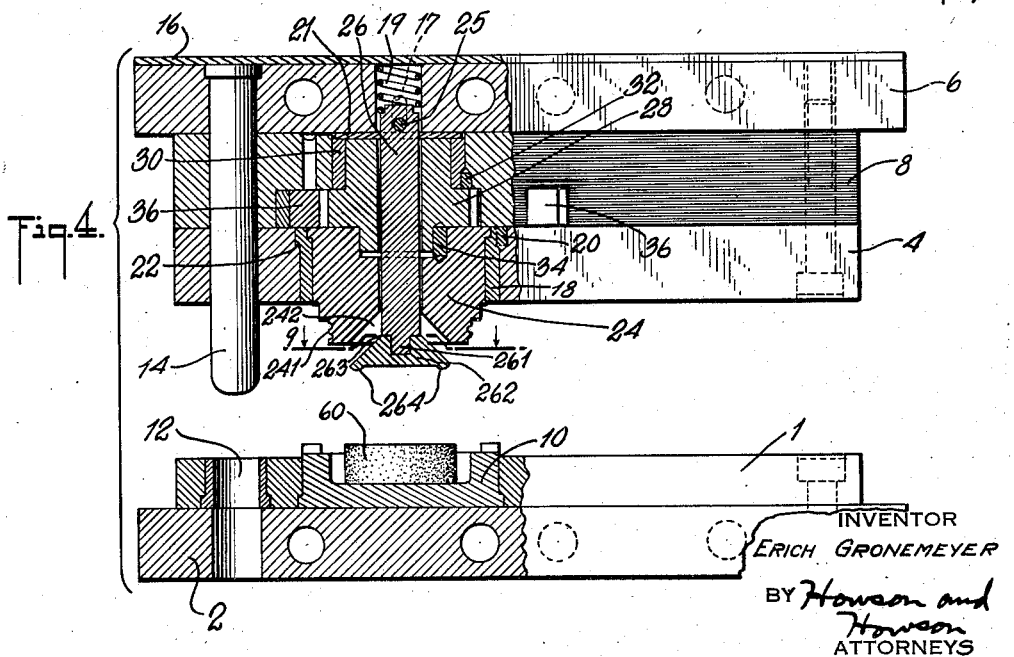

INVENTOR
ERICH GRONEMEYER
BY Howson and Howson
ATTORNEYS

INVENTOR
ERICH GRONEMEYER
BY Howson and Howson
ATTORNEYS

Patented July 23, 1946

2,404,631

UNITED STATES PATENT OFFICE 2,404,631

MOLDING DIE AND MEANS FOR REMOVING MOLDED ARTICLES THEREFROM

Erich Gronemeyer, Pompton Plains, N. J., assignor to Mack Molding Company, Incorporated, Wayne, N. J., a corporation of New Jersey Application February 9, 1944, Serial No. 521,669

6 Claims. (Cl. 18—16)

This invention relates to dies for forming threaded articles of thermo-plastic or thermo-setting materials and more particularly to means for removing the articles from the dies and it is an object of this invention to provide means for rapidly and simultaneously removing a plurality of molded threaded articles from the dies by which the articles are made and it is a further object to provide a construction of the dies for forming the articles and the means for removing the articles from the dies such that the time required for molding and setting the articles is reduced to a minimum and without danger of the articles being distorted or deformed before or during removal from the dies.

In the drawings in which the invention is shown applied to dies for the molding of interiorly threaded container caps:

Fig. 1 is a broken top plan view of dies and means for removing molded caps from the dies constructed in accordance with this invention;

Fig. 2 is a view, partly in side elevation and partly in vertical section, as on line 2—2 of Fig. 1, of the apparatus shown in Fig. 1;

Fig. 3 is a partial top plan view of the dies shown in Fig. 1, drawn to a larger scale and having parts broken away to show other parts more clearly;

Fig. 4 is a vertical sectional view taken as on line 4—4 of Fig. 3, showing the dies separated and with molding material in the lower die preparatory to a molding operation;

Fig. 7 is a plan view showing the interior of a cap molded by the dies shown in Figs. 1 to 6;

Fig. 8 is a bottom plan view of a portion of the upper die which molds part of the inner face of the cap;

Fig. 9 is a sectional view taken as on line 9—9 of Fig. 4; and

Figure 5:
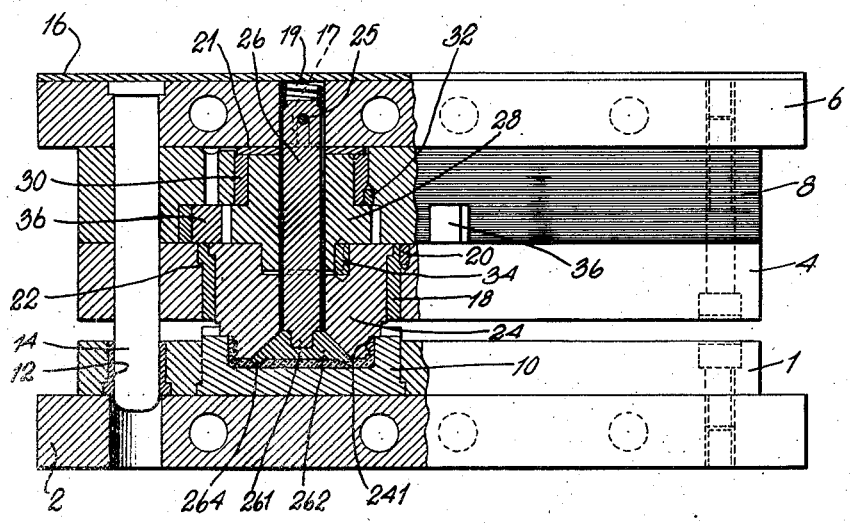
Fig. 5 is a view similar to Fig. 4 showing the dies pressed together for the molding operation.
Figure 6:
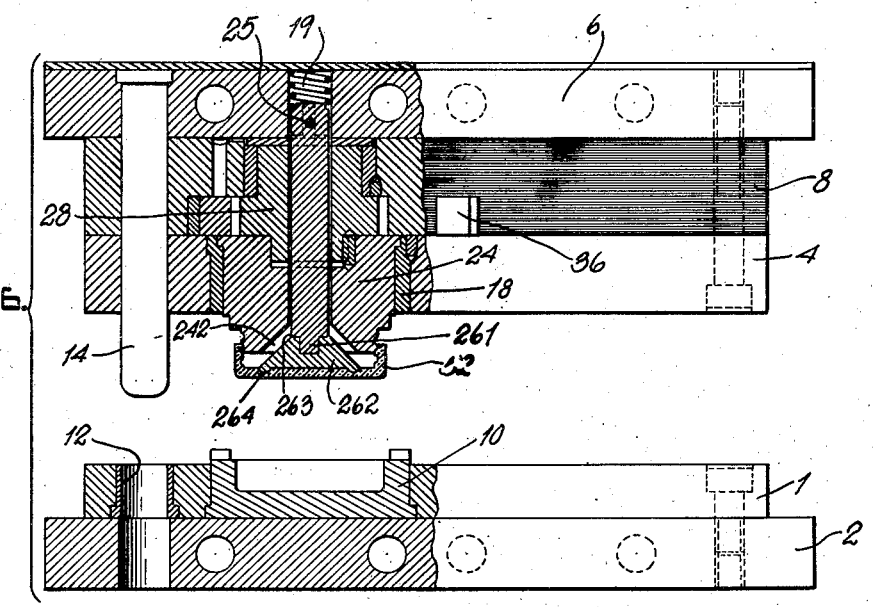
Fig. 6 is a view similar to Fig. 4 showing the dies separated during the operation of removing the cap from the upper die.

In the drawings the invention is shown in connection with a lower die holder 1 secured to a lower plate 2 and an upper die holder 4 secured to an upper plate 6 but spaced therefrom by a filler plate 8. The die holders are shown as being formed with cavities for only a small number of dies but a larger number of cavities may be provided. In each cavity in the lower die holder 1 there is placed a die 10 which is recessed to receive the upper die and is held in position by cooperating shoulders on the die and the lower die holder 1. The lower die holder 1 and lower plate 2 are formed with the usual guide openings 12 to receive the usual guide pins 14 which are secured in openings in the top plate 6 by a cover plate 16 and project from the top die holder 4 so as to be engaged in the openings 12.

In the upper die holder 4 there are formed cavities corresponding to the cavities of the lower die holder 1 and mounted in each cavity is a bushing 18 secured against rotation by a key 20, the bushing and die holder being formed with cooperating shoulders, as at 22, which serve to position the bushing in the die holder. Rotatably mounted in each bushing 18 is an upper or male die 24, which is shaped, as at 241, to form an internal thread on the molded cap. The die 24 is centrally bored to freely receive a pin 26 and recessed as at 242 to receive the tapered end piece 262 of the pin. The die 24 has its upper surface recessed to receive a projecting portion of a gear 28 which is journaled in a bushing 30 fixed in an opening in the filler plate 8 by a key 32. A key 34 secures the die 24 for rotation with the gear 28.

Slidably mounted in grooves in the filler plate 8 and engaging with the gears 28 are the rack bars 36 which project beyond the filler plate 8 and are connected to a cross head 38. The cross head 38 is mounted for reciprocation in guides 40 which are secured to opposite sides of the top plate 6 and are joined adjacent their outer ends by cross members 42. The members 42 also serve to support a cylinder 44 in which is a piston (not shown) connected by a rod 46 to the cross head 38 to operate the same. A suitable fluid operating medium is supplied to the cylinder 44 to operate the piston therein and thus reciprocate the rack bars 36 and rotate the gears 28 and dies 24.

The pin 26 projects into an opening in the top plate 6 and adjacent its upper end the pin 26 is provided with an opening in which is fitted a small pin 25 which projects on both sides of the pin 26 and engages in grooves 17 cut in the wall of the opening in the top plate 6 to prevent the pin 26 from turning. A spring 19 confined between the top of the pin 26 and the cover plate 16 biases the pin 26 to its lowest position and a washer 21 secured between the bushing 30 and the top plate 6 engages the pin 25 to limit the downward movement of the pin 26. At its lower end the body of the pin 26 is formed with a reduced end portion 261 which fits a recess in a tapered end piece 262. The end portion 261 and the recess into which it fits in the end piece 262 may be angular in shape to prevent relative rotation of the pin 26 and end piece 262, as shown in Fig. 9, or they may be cylindrical in shape and reliance placed on the welding at the joint 263 by which the end piece 262 is secured to the pin 26 to prevent such relative rotation.

The outer face of the end piece 262 is formed with a plurality of spaced curved projections 264 adjacent its outer edge designed to form recesses 50 in the inner face of the cap 52 and to interlock therewith to prevent rotation of the cap 52 with respect to the end piece 262.

In practice, the lower and upper plates 2 and 6 are secured to the lower and upper heads respectively of a press, the lower head preferably being operable to raise and lower the lower die holder and its dies while the upper head remains stationary in the position to which it is adjusted. With the lower head in a lowered position and the dies separated, the pin 26 will be in its lowered position as shown in Fig. 4. A pellet 60 of the material of which the cap is to be formed is then placed in each lower die and these dies raised. The pellet 60 engages the end piece 262 of the pin 26, forcing the pin 26 upwardly against the action of spring 19 until the end piece 262 is seated in the recess 242 of the male die 24. Continued upward movement until the lower dies and the upper dies engage, as shown in Fig. 5, results in shaping the material between the dies and the dies are held engaged during whatever period is necessary to set the molded material sufficiently to permit removal of the cap from the dies. When the molded material is sufficiently set, the lower die is lowered, leaving the cap 52 threaded on the upper die and ending any danger of a partial vacuum between the lower die and the cap causing the cap to bulge outwardly. Upon the lower die being dropped, fluid under pressure is supplied to the cylinder 44 to operate the piston therein in a direction such that the racks 36 operate the gears 28 and the upper dies 24 in a direction to unscrew the dies 24 from the caps 52. As the dies 24 are held against vertical movement and the caps 52 are held against rotation by the projections 264 on pins 26, the rotation of the dies 24 forces the caps 52 downwardly, breaking the seal between the upper dies 24 and the caps 52 and permitting any gas which was formed during the molding operation to escape along the pins 26. The pins 26 being free to move under the pressure of spring 19 are held against the caps so that the projections 264 prevent rotation of the caps until the dies 24 are unscrewed from the caps and the caps permitted to drop. Fluid under pressure is then admitted to the cylinder 44 to return the racks 36, gears 28 and upper dies 24 to their initial positions and pellets 60 are placed in the lower dies 10 for the next molding operation.

Figure 10:
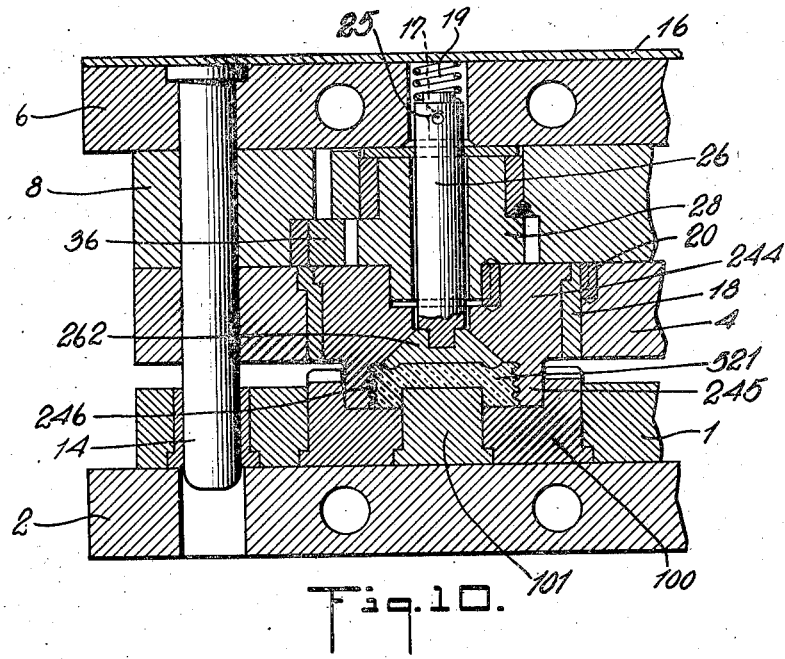
Figs. 10 and 11 are partial vertical sectional views showing dies of modified constructions.

In the modified construction shown in Fig. 10 the female die 100 secured in the lower die holder 1 has an opening in which is secured a member 101 which projects into the recess of the die 100 so as to form an angular recess in the molded article 521. Rotatably mounted in the bushing 18 in the upper die holder 4 is a die 244 arranged to be rotated by the gear 28 and rack 36 and having a circular projecting portion 245 which closely fits the recess in the die 100 and is interiorly threaded, as at 246, to provide an exterior thread on the molded article 521. The gear 28 and the die 244 have alined central openings to receive the pin 26 having the tapered end piece 262 which fits a correspondingly shaped recess in the die 244. The pin 26 is held against rotation by a pin 25 while being permitted a limited longitudinal movement and the end piece 262 is shaped to interlock with the molded article 521 and to prevent rotation thereof.

Figure 11:
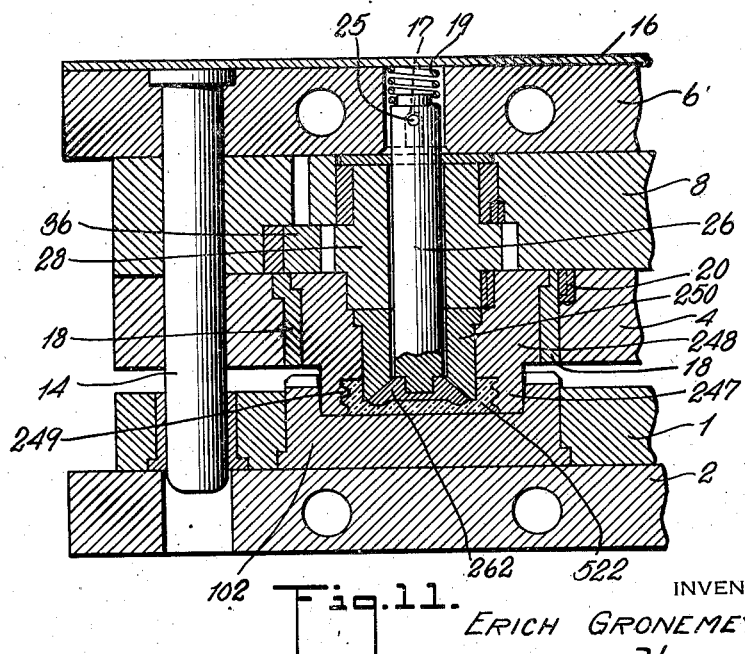

In the modification shown in Fig. 11, the female die 102 secured in the lower die holder 1 receives the closely fitting annular extension 247 of the die 248 which is rotatably mounted in the bushing 18 in the upper die holder 4. The die 248 is rotated by means of the gear 28 and rack 36 and the extension 247 is interiorly threaded, as at 249, to form an exterior thread on the molded piece 522.

The die 248 has a central opening in which is mounted a die 250 while the gear 28 and the die 250 have alined openings in which are mounted the pin 26 and its tapered end piece 262. As in the other constructions, the pin 26 is held against rotation by the pin 25 while being permitted a limited longitudinal movement and the end piece 262 is shaped to interlock with the molded article 522 and prevent rotation thereof.

In the operation of these constructions, after the article has been molded, the lower plate and die holder are dropped, withdrawing the lower die from the molded article. The rack is then operated to rotate the gear 28 and the upper die 244 or 248 in a direction to unscrew the die from the molded article. The article is held against rotation by the end piece 262 until it is screwed out of the die 244 or 248, the end piece 262 being held in engagement with the article by the spring 19. When unscrewed from the die 244 or 248 the article drops from the end piece 262. The rack is then operated to its original position and the parts are ready for another molding operation.

What is claimed is:

1. In a molding device, a die for molding a threaded article, said die having a threaded annular rotatably mounted portion held against axial movement and a movable central portion held against rotation, said central portion being shaped to hold the molded article against rotation, means for rotating said rotatably mounted die portion to remove the molded article from the die and means holding said central non-rotatable die portion in engagement with the molded article until the molded article is removed from the rotatable die portion.

2. In a molding device, a die for molding a threaded article, said die having an annular threaded rotatably mounted portion held against axial movement and a movable central portion held against rotation, said central die portion being shaped to hold the molded article against rotation, means for rotating said rotatably mounted die portion to remove said molded article from the rotatable die portion, the molded article being moved bodily by the rotation of said die portion, and spring means to hold said central die portion engaged with the molded article until said molded article is removed from said rotatable die portion.

3. In a molding device, a male die for molding a threaded article, said die having an annular threaded portion and a movable central portion held against rotation, said central die portion being shaped to hold the molded article against rotation, a gear operatively connected to said annular die portion, means rotatably supporting said gear and annular die portion and holding said annular die portion against axial movement, a longitudinally movable rack bar engaging said gear, means to operate said rack bar and gear to rotate said annular die portion to remove the molded article from said annular die portion and spring means for holding said central die portion in engagement with the molded article until said article is removed from said annular die portion.

4. In a molding device, a male die for molding a threaded article, said die having an annular threaded portion and a central die portion movably mounted in said annular die portion, said central die portion being held against rotation and shaped to hold the molded article against rotation and said die portions cooperating to control a vent passage through said annular die portion from the space between the article and said annular die portion, means rotatably supporting said annular die portion and holding said annular die portion against axial movement, means for rotating said annular die portion to remove the molded article therefrom and means for moving said central die portion to hold said central die portion engaged with the molded article and to open said vent passage through said annular die portion upon rotation of said annular die portion.

5. In a molding device, a male die for molding a threaded article, said die having an annular threaded portion and a central die portion movably mounted in said annular die portion and cooperating therewith to control a passage through said annular die portion, said central die portion being held against rotation and shaped to hold the molded article against rotation, means rotatably supporting said annular die portion and holding said annular die portion against axial movement, means for rotating said annular die portion to remove the molded article therefrom and means for moving said central die portion to hold said central die portion engaged with the molded article and to open said passage through said annular die portion to vent the space between the article and said annular die portion upon rotation of said annular die portion.

6. In a molding device, a male die for molding a threaded article, said die having an annular threaded portion and a central die portion movably mounted in said annular die portion, said annular die portion having a conical recess and said central die portion having a conical shape and engaging in said recess to control a passage through said annular die portion, said central die portion being held against rotation and shaped to hold the molded article against rotation, means rotatably supporting said annular die portion and holding said annular die portion against axial movement, means for rotating said annular die portion to remove the molded article therefrom and means for moving said central die portion to hold said central die portion engaged with the molded article and to open said passage through said annular die portion to vent the space between the article and said annular die portion upon rotation of said annular die portion.

ERICH GRONEMEYER.